United States Patent

[11] 3,540,670

[72] Inventor Arthur C. Rissberger, Jr.
Webster, New York
[21] Appl. No. 738,279
[22] Filed June 19, 1968
[45] Patented Nov. 17, 1970
[73] Assignee Eastman Kodak Company
Rochester, New York
a corporation of New Jersey

[54] DYNAMICALLY BALANCED SPOOL
9 Claims, 4 Drawing Figs.

[52] U.S. Cl. .......... 242/71.8
[51] Int. Cl. .......... B65h 75/18
[50] Field of Search .......... 242/71.8A, 71.8

[56] References Cited
UNITED STATES PATENTS
3,330,494 7/1967 Rissberger .......... 242/71.8A
FOREIGN PATENTS
1,177,839 10/1964 Germany .......... 242/71.8A

*Primary Examiner*—Nathan L. Mintz
*Attorneys*—Walter O. Hodson, P. R. Holmes and W. E. Jackson

ABSTRACT: A universal film spool or reel having various openings to engage the spindles of conventional devices and an identification numeral perforated in each flange. The perforated numerals are located at unique points on the flange to affect dynamic balance of the spool or reel.

ARTHUR C. RISSBERGER, JR.
INVENTOR.

BY

ATTORNEYS & AGENT

DYNAMICALLY BALANCED SPOOL

The present invention relates to film spools and reels and, more particularly, to those which have identified flanges and which are also dynamically balanced.

In the film industry it has been customary to wind unexposed film on supply spools and to wind processed film on storage reels. It has been found convenient in certain instances to identify the flanges of a spool or reel with a symbol since it helps the users to correctly position the spool or reel in a particular apparatus such as cameras, projectors, and film processors.

In recent years there have been attempts to standardize the configurations and dimensions of supply spools and storage reels so that they fit the different spindles found on the several types of apparatus on the market. One standard universal spool or reel construction which has been proposed includes spindle openings and offset drive holes and slots which are oriented for engagement with the drive means of different types of apparatus. These proposals have been acceptable for most equipment but have created certain difficulties when used with apparatus which are operated at relatively high speeds. For example, high-speed motion picture cameras are operated at speeds which may create undesirable vibrations of the film if the supply spool is not in substantial dynamic balance. The proposed standard universal spool or reel, with its offset drive holes and slots, creates undesirable vibrations in high-speed devices unless it is dynamically balanced.

An object of the present invention is to provide an identifying symbol for the flanges of a spool or reel.

Another object of the invention is to obtain a spool or reel which is dynamically balanced.

Still another object of the invention is to provide a method of simultaneously correcting for dynamic imbalance in a spool or reel and providing an identifying symbol for the flanges thereof.

A further object of the invention is to improve the dynamic balance of universal film spools or reels which have been proposed as standards while at the same time providing identification for their flanges.

Other objects and advantages of the present invention will be apparent to those skilled in the art by description of a preferred embodiment of the invention which follows.

The objects of the present invention are accomplished by providing the flanges of a spool or reel with means, such as perforations, which are shaped to define a symbol and which are uniquely arranged to affect the weight distribution of the spool or reel to correct for dynamic imbalance therein.

While the terms "reel" and "spool" have different connotations in the art, the term "spool" as used in the present application is meant to define in a generic sense any member on which an unexposed or processed strip of film, or similar strip, can be wound.

Reference is now made to the accompanying drawing wherein like reference numerals designate like parts and wherein.

Figure 1:
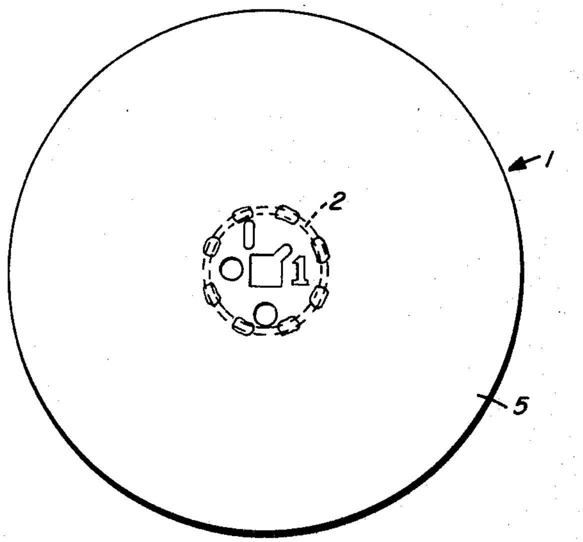
FIG. 1 is a side view of a spool as would be seen looking along a spindle axis.
Figure 4:
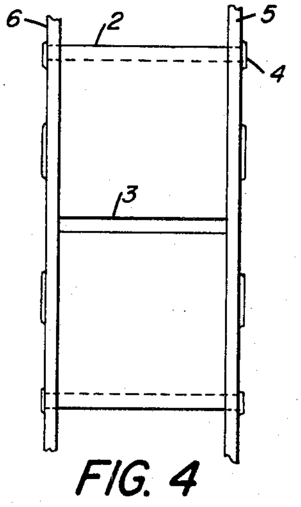
FIG. 4 is an end view of a spool showing the aperture in the core for receiving an end of a strip.

With particular reference to FIGS. 1 and 4, a spool 1 is shown comprising a core 2, two metal flanges 5 and 6, and a plurality of deformed tabs 4, 4′ connecting the flanges to the core. The core 2 is in the form of a cylinder of sheet metal and has a slot 3 for receiving an end of a film strip as is well known in the art.

Figure 2:
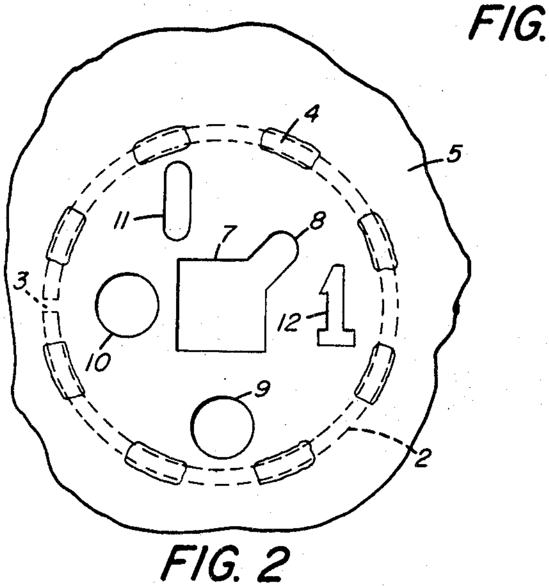
FIG. 2 is an enlarged view of the central portion of the spool shown in FIG. 1.
Figure 3:
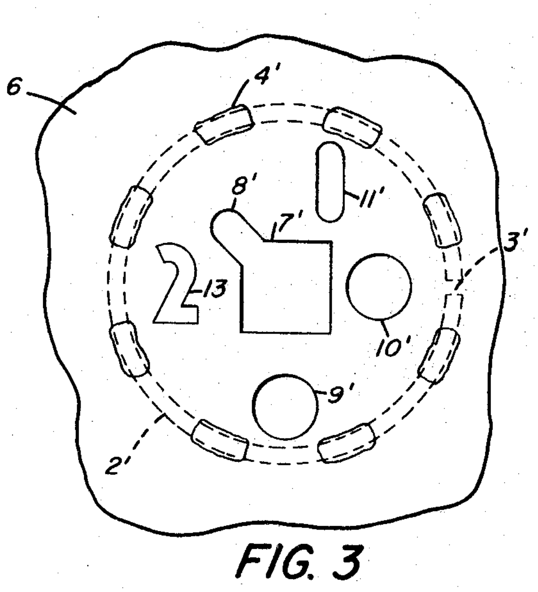
FIG. 3 is an enlarged view of the central portion of the opposite side of the spool shown in FIG. 1.

As best illustrated by FIGS. 2 and 3, the central portion of the spool's flanges contains various openings. The square openings 7, 7′ are for positioning the reel on the conventional square-section spindle in a camera, projector, or the like. The keyways 8, 8′ in the corner of openings 7, 7′ are oriented to engage the key which is utilized on some of the apparatus on the market to position or drive a spool. The offset holes 9, 9′ and 10, 10′ and slots 11, 11′ are provided in the central portion of the spool flange for similar conformity to other existing apparatus. To this point, the spool construction described is well known in the art as it has been suggested as a standard universal spool.

According to a preferred embodiment of the present invention, each central portion of the flanges is provided with a perforated symbol. In FIG. 2, the numeral "1" is perforated at 12. Likewise, the numeral "2" is perforated at 13 in FIG. 3. These perforated numerals serve two functions. First, they enable a user of the spool to orient the same in a predetermined manner relative to the mounting spindle in an apparatus. Second, they have unique locations and sizes whereby they provide for the correction of dynamic imbalance in the spool. In the particular spool herein described, dynamic imbalance results from surface discontinuities in several portions of the spool. For example, slot 3 creates a dynamic imbalance in the core 2 since it changes the symmetric distribution of the core's weight around the spindle axis. Moreover, the connecting tabs 4, 4′ between the core and the flanges may create dynamic imbalance if they vary in size or location about the spindle axis. Further, the openings, keyways and holes 7, 7′ through 11, 11′ create dynamic imbalance about the spindle axis due to their asymmetric locations relative thereto.

Accordingly, the size, shape, and location of the symbols 12 and 13 are selected to correct the spool for imbalance from the above, as well as any other sources. Dynamic balancing is a well-known procedure by which a rotating body can be balanced by adding or removing correcting weights. A description of the theory of dynamic balancing can be found in various published works such as Marks' Mechanical Engineers' Handbook, sixth edition, 1958. In the particular balancing application described herein, where two perforated numerals are used, the properly configured perforations are applied to the flanges to remove the correcting weight to provide substantial dynamic balance. The spool of the preferred embodiment can be used in high speed movie cameras without creating undesirable vibrations.

While it is very convenient to use perforated numerals in the two flanges of the universal spool shown in the drawings, it is contemplated within the scope of the present invention that a perforated letter or other symbol, and combinations thereof, may be used on a flange or flanges to dynamically balance a spool having the imbalance introduced from any source. Moreover, it is contemplated that the number or other symbols could be in the form of a raised surface portion of the flange as would be the case if they were integrally molded with the flange. If raised surface portions were used they would have to be relocated to the unique point on the flange where they produce dynamic balance of the spool.

The invention has been described in detail with particular reference to preferred embodiments thereof, but it will be understood that variations and modifications can be effected within the spirit and scope of the invention as described hereinabove and as defined in the appended claims.

I claim:

1. In a flanged spool having spindle-engaging means incorporated in a flange thereof, the improvement wherein said flange is provided with means for defining a symbol and for correcting dynamic imbalance of said spool, said defining and correcting means comprising at least one perforation in said flange.

2. The invention of claim 1 wherein said spindle-engaging means includes a square hole with a corner keyway, two offset holes, and an elongated slot; and said defining and correcting means comprises at least one perforation in said flange whereby the dynamic imbalance introduced by said spindle-engaging means is corrected.

3. In a spool for use with a spindle, said spool having a core, at least one flange provided with means for engaging spool-positioning means on said spindle; and means attaching said core to said flange, the improvement wherein said flange is provided with means integrally molded on the surface of and adding to the mass of said flange for defining a symbol and for correcting dynamic imbalance of said spool.

4. In a spool for use with a spindle, said spool having a core, at least one flange provided with means for engaging spool-positioning means on said spindle; and means attaching said core to said flange, the improvement wherein said flange is provided with means for defining a symbol and for correcting dynamic imbalance of said spool, said defining and correcting means comprising at least one perforation in said flange.

5. The invention of claim 4 wherein said means for engaging said spool-positioning means includes a square hole with a corner keyway, two offset holes, and an elongated slot, and said defining and correcting means comprises at least one perforation in said flange.

6. In a spool having a core: two flanges, each having a square hole with a corner keyway, two offset holes, and an elongated slot; and means attaching said flanges to said core, the improvement wherein each flange is provided with means for defining a symbol and for correcting dynamic imbalance, said defining and correcting means being a perforation in the form of the numeral 1 in one flange and the numeral 2 in the other flange.

7. A method of manufacturing a flanged spool comprising the steps of:

1. removing a portion of said flange at the position on said flange required to correct for dynamic imbalance of said spool; and
2. shaping said portion in the form of a symbol.

8. A method of dynamically balancing a flanged spool and identifying a flange thereof, the method comprising the steps of:

1. providing said flange with means integrally molded on the surface of and adding to the weight of said flange for altering its weight and for defining a symbol thereon; and
2. locating said defining and altering means in a position on said flange to correct for dynamic imbalance of said spool.

9. A method of dynamically balancing a flanged spool and identifying a flange thereof, the method comprising the steps of:

1. providing said flange with means for altering its weight and for defining a symbol thereon by perforating said flange; and
2. locating said defining and altering perforation in a position on said flange to correct for dynamic imbalance of said spool.